(12) United States Patent
Alfano

(10) Patent No.: US 7,856,011 B2
(45) Date of Patent: *Dec. 21, 2010

(54) REORDERING PACKETS

(76) Inventor: Vic Alfano, 30501 Agoura Rd. Ste 203, Agoura Hills, CA (US) 91301

( * ) Notice: Subject to any disclaimer, the term of this patent is extended or adjusted under 35 U.S.C. 154(b) by 1154 days.

This patent is subject to a terminal disclaimer.

(21) Appl. No.: 11/237,482

(22) Filed: Sep. 27, 2005

(65) Prior Publication Data
US 2006/0072578 A1 Apr. 6, 2006

Related U.S. Application Data

(63) Continuation of application No. 10/044,244, filed on Jan. 11, 2002, now Pat. No. 6,967,951.

(51) Int. Cl.
*H04L 12/50* (2006.01)
(52) U.S. Cl. .................... 370/383; 370/395.7
(58) Field of Classification Search .......... 370/412, 370/428, 389, 429, 413–418, 394, 360, 235, 370/363, 395.3, 366, 368, 371, 374, 378, 370/381, 382, 383, 395.7, 395.71
See application file for complete search history.

(56) References Cited

U.S. PATENT DOCUMENTS

| | | | |
|---|---|---|---|
| 4,330,824 A | 5/1982 | Girard | |
| 4,394,725 A | 7/1983 | Bienvenu | |
| 4,740,954 A | 4/1988 | Cotton | |
| 4,754,451 A | 6/1988 | Eng | |
| 5,127,000 A | 6/1992 | Henrion | |
| 5,412,646 A | 5/1995 | Cyr | |
| 5,521,923 A * | 5/1996 | Willmann et al. | ........... 370/412 |
| 5,550,823 A | 8/1996 | Irie | |
| 5,555,543 A | 9/1996 | Grohoski | |
| 5,606,370 A | 2/1997 | Moon | |
| 5,845,145 A | 12/1998 | James | |
| 5,859,835 A | 1/1999 | Varma | |
| 5,860,085 A | 1/1999 | Stormon | |

(Continued)

OTHER PUBLICATIONS

Petaswitch Solutions, Inc., The Pisces Chipset, Product Brief, 2001, http://www.peta-switch.com/products/product_brief.htm.

(Continued)

*Primary Examiner*—Brenda Pham
(74) *Attorney, Agent, or Firm*—McDonnell Boehnen Hulbert & Berghoff LLP

(57) ABSTRACT

There are disclosed processes and apparatus reordering packets. The system includes a plurality of source processors that transmit the packets to a destination processor via multiple communication fabrics. The source processors and the destination processor are synchronized together. Time stamp logic at each source processor operates to include a time stamp parameter with each of the packets transmitted from the source processors. The system also includes a plurality of memory queues located at the destination processor. An enqueue processor operates to store a memory pointer and an associated time stamp parameter for each of the packets received at the destination processor in a selected memory queue. A dequeue processor determines a selected memory pointer associated with a selected time stamp parameter and operates to process the selected memory pointer to access a selected packet for output in a reordered packet stream.

34 Claims, 4 Drawing Sheets

U.S. PATENT DOCUMENTS

| | | | |
|---|---|---|---|
| 5,898,689 | A | 4/1999 | Kumar |
| 5,905,911 | A | 5/1999 | Shimizu |
| 5,909,440 | A | 6/1999 | Ferguson |
| 5,923,893 | A | 7/1999 | Moyer |
| 5,982,749 | A | 11/1999 | Daniel |
| 6,026,092 | A | 2/2000 | Abu-Amara |
| 6,067,408 | A | 5/2000 | Runaldue |
| 6,172,927 | B1 | 1/2001 | Taylor |
| 6,192,465 | B1 | 2/2001 | Roberts |
| 6,246,684 | B1 | 6/2001 | Chapman |
| 6,256,315 | B1 * | 7/2001 | Barbas et al. ............... 370/412 |
| 6,389,489 | B1 | 5/2002 | Stone |
| 6,438,134 | B1 * | 8/2002 | Chow et al. ................. 370/412 |
| 6,442,674 | B1 | 8/2002 | Lee |
| 6,493,347 | B2 | 12/2002 | Sindhu |
| 6,570,876 | B1 | 5/2003 | Aimoto |
| 6,574,194 | B1 | 6/2003 | Sun |
| 6,687,768 | B2 | 2/2004 | Horikomi |
| 6,735,647 | B2 | 5/2004 | Boyd |
| 6,754,741 | B2 | 6/2004 | Alexander |
| 6,795,870 | B1 | 9/2004 | Bass |
| 6,907,041 | B1 | 6/2005 | Turner |
| 6,967,951 | B2 * | 11/2005 | Alfano ....................... 370/394 |
| 2001/0037435 | A1 | 11/2001 | Van Doren |
| 2002/0054602 | A1 | 5/2002 | Takahashi |
| 2002/0061022 | A1 | 5/2002 | Allen |
| 2002/0099855 | A1 | 7/2002 | Bass |
| 2002/0122386 | A1 | 9/2002 | Calvignac |
| 2002/0165947 | A1 | 11/2002 | Ackerman |
| 2003/0035427 | A1 | 2/2003 | Alasti |
| 2003/0214949 | A1 * | 11/2003 | Shaikli ....................... 370/394 |

OTHER PUBLICATIONS

Petaswitch Solutions, Inc., PetaSwitch Solutions Announces Raising $4 Million in First Round Financing, Press Release, 2001, http://peta-switch.com/newsroom/press_releases.htm.

Petaswitch Solutions, Inc., Company Overview, 2001, http://www.peta-switch.com/markets/overview.htm.

Gupta, Scheduling in Input Queued Switches: A Survey, Jun. 1996, Department of Computer Science, Stanford University, California.

Schoenen, et al., Distributed Cell Scheduling Algorithms for Virtual-Output-Queued Switches, Dec. 1999, pp. 1211-1215, vol. 1, Globecom, IEEE Global Telecommunications Conference.

Fahmy, A Survey of ATM Switching Techniques, Aug. 14, 2001, Department of Computer and Information Science, The Ohio State University.

Stiliadis, et al., Rate-Proportional Servers: A Design Methodology for Fair Queueing Algorithms, Dec. 1995, Computer Engineering & Information Sciences, University of California. Santa Cruz.

Stoica, et al., Earliest Eligible Virtual Deadline First: A Flexible and Accurate Mechanism for Proportional Share Resource Allocation, Department of Computer Science, Old Dominion University, Norfolk, VA.

* cited by examiner

REORDERING PACKETS

RELATED APPLICATION INFORMATION

This patent application is a continuation of U.S. patent application Ser. No. 10/044,244 filed Jan. 11, 2002, now U.S. Pat. No. 6,967,951, issued Nov. 22, 2005, which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to reordering packets.

2. Description of the Related Art

Communications networks now require handling of data at very high data rates. For example, 10 gigabits per second (Gbps) is common. When it is required to process data at these speeds, multiple high-speed parallel connections may be used to increase the effective bandwidth. However, this may result in one or more transmission problems, since the data streams must be divided to be distributed over the multiple parallel connections, and then at some point after parallel transmission, recombined to form the original streams.

DESCRIPTION OF DRAWINGS

The foregoing aspects and the attendant advantages of this invention will become more readily apparent by reference to the following detailed description when taken in conjunction with the accompanying drawings wherein.

DETAILED DESCRIPTION OF PREFERRED EMBODIMENT

The present invention includes a system for reordering sequenced based packets in a switching network. For example, in one embodiment of the invention, a reordering system is provided that receives packets from multiple sources and reorders the received packets based on a time stamp associated with each packet. Thus, various embodiments of the system included in the present invention are discussed in detail in the following text.

Exemplary Embodiment

Figure 1:
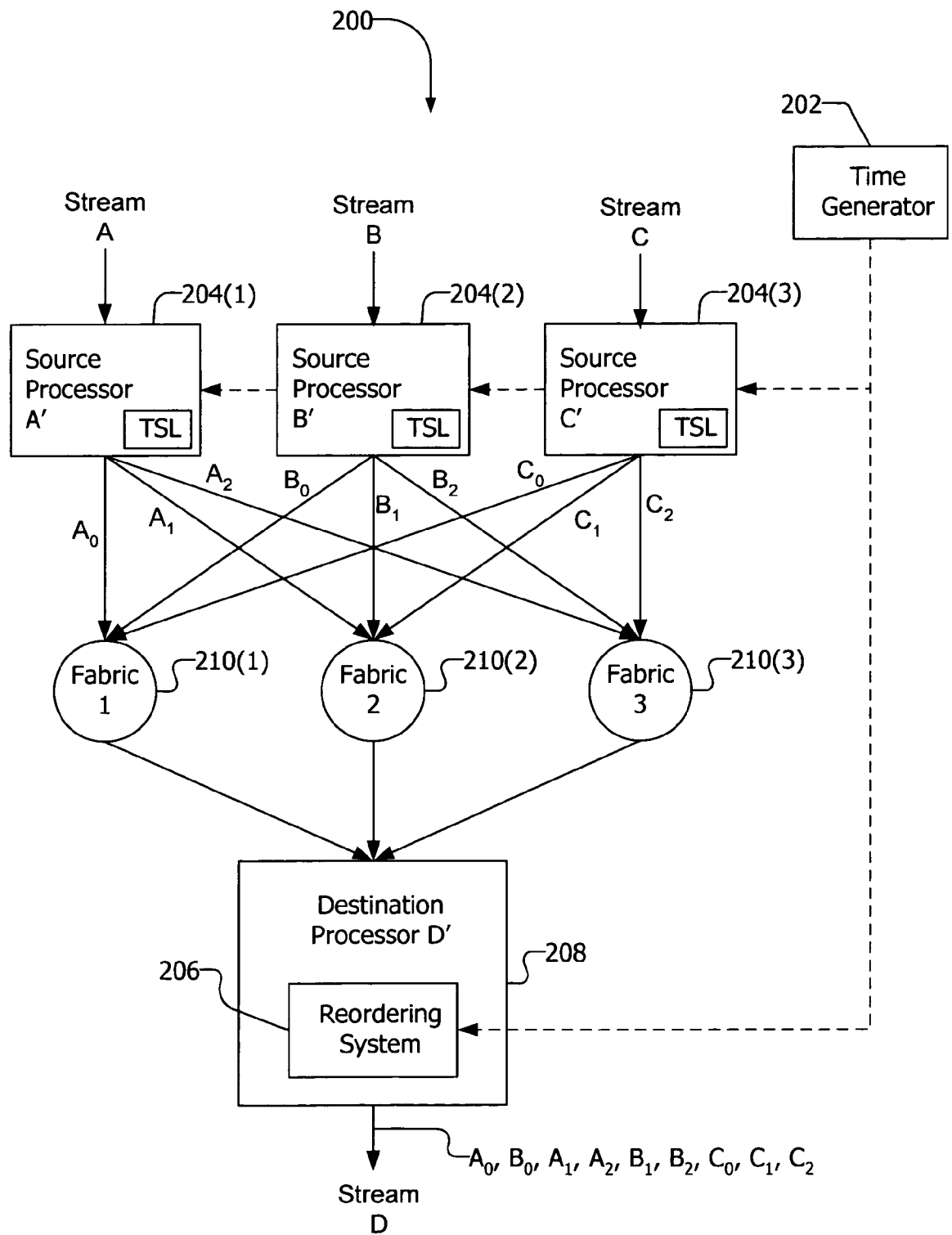
FIG. 1 shows a diagram showing one embodiment of a system for reordering frames.

FIG. 1 shows a diagram of one embodiment of a system 200 for reordering frames in accordance with the present invention. The system 200 includes a time generator 202 that provides time information to a number of source processors 204 and at least one destination processor 208, so that all processors have synchronized time signals available. In another embodiment, the source and destination processors include time generators and the time generators are synchronized, so that the source and destination processors operate using identical timing signals.

During operation of the system 200, the source processors 204 receive data streams (A, B, C) containing data frames. The source processors operate to give each of the data frames a time stamp prior to transmitting them to the destination processor via multiple communication fabrics 210.

In one embodiment of the invention, the source processors also assign a priority to each frame in addition to the time stamp. Thus, each frame that is transmitted via the fabrics 210 includes timing, and optionally, priority information.

Any technique can be used to include time stamps and/or priority information with the data frames. For example, in one embodiment, the source processors include time stamp logic (TSL) that stamps each data frame with a time stamp prior to transmission.

The time stamp logic (TSL) at each source processor is coupled to the time generator 202 so that the time stamp logic for all source processors are synchronized together. However, any technique to synchronize the time stamp logic for all source processors and the destination processor can be used.

Furthermore, the time stamp logic (TSL) can include a priority indicator with each frame. The priority indicator can be selected to be one of several priority levels.

Thus, any suitable technique can be used within the scope of the invention to associate timing and priority information with each data frame prior to transmission. For example, the TSL may comprise any type of CPU, processor, gate array or other type of hardware and/or associated software to provides time stamps and priority to the frames prior to transmission to the destination processor.

The system 200 also includes a reordering system 206 at the destination processor 208. The reordering system 206 operates to receive the frames from the fabrics 210 and process the frames based on their respective time stamps (and priority) to reorder the frames. The frames are reordered so that with respect to the transmission from each source processor, the frames are placed in an identical order as when transmitted. Thus, stream D includes all the frames in correct order with respect to their transmitting source processor.

Figure 2:
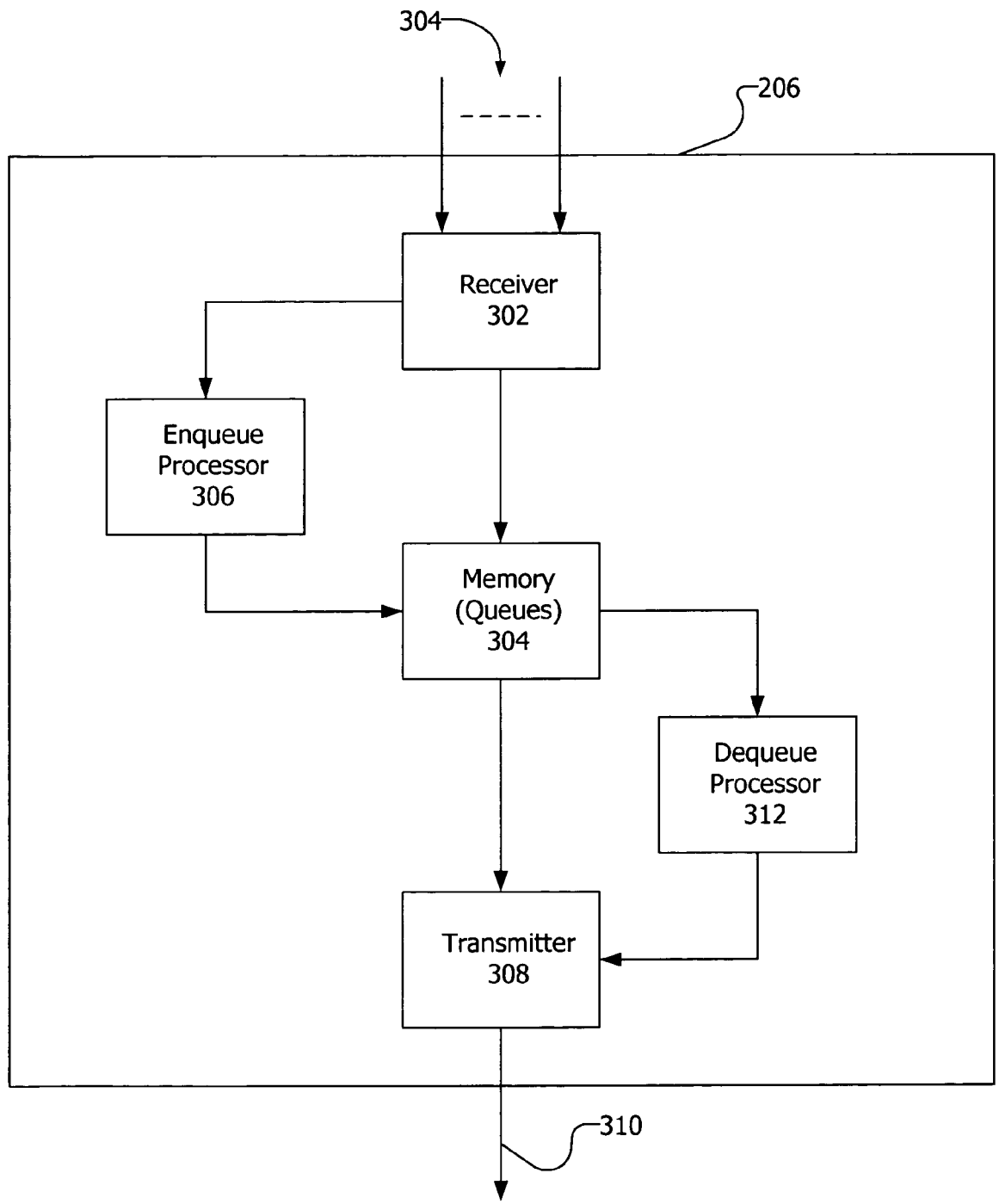
FIG. 2 shows a diagram of one embodiment of a reordering processor.

FIG. 2 shows a diagram of one embodiment of the reordering system 206 constructed in accordance with the present invention. The reordering system 206 forms part of the destination processor 208 and operates to provide reordering of frames in accordance with the invention. However, the source and destination processors may operate on the data frames in other ways to facilitate their transmission. These other processes will not be described in detail herein since they are not essential to the operation of the one or more embodiments of the invention. For example, the destination processor may serialize the frames for transmission, or provide known error detection and correction processes that are independent from the reordering system.

A receiver 302 receives one or more streams 304 that arrived at the destination processor. For example, the receiver 302 receives the streams transmitted to the destination via the fabrics 210. The receiver 320 is coupled to a memory 304 that includes memory queues, so that each of the received frames may be stored in the memory and corresponding memory pointers may be placed in selected memory queues.

An Enqueue processor 306 is coupled to both the receiver 302 and the memory 304, so that the Enqueue processor 306 can control the process of storing the frames of data in the memory and loading memory pointers to the stored frames into the memory queues. The Enqueue processor may comprise any suitable hardware such as a CPU, gate array or other hardware logic, and may also include any suitable software to operate in conjunction with the hardware.

The memory 304 is coupled to a transmitter 308 that receives the frames as they are transferred out of the memory 304 in the correct order in accordance with the present invention. In one embodiment, the memory queues function as first-in-first-out memory queues. Thus, as the data frames are received and stored into memory, the pointers associated with the stored frames are loaded into the memory queues and flow through the memory queues to queue outputs. Thus, the first pointer loaded into a selected memory queue will be the first to appear at the respective queue output.

In one embodiment, the transmitter 308 transmits the frames in a single stream 310 toward their final destination. In another embodiment, the transmitter may transmit the stream 310 over several communication fabrics to the next destination. For example, the transmitter may transmit the stream 310 into multiple other communication fabrics that are coupled to the next destination.

A Dequeue processor 312 is coupled to the memory 304 and the transmitter 308. The Dequeue processor operates to control the reordering of frames and to retrieve the frames from the memory and transfer them to the transmitter 308. For example, in one embodiment, the Dequeue processor operates to control the transfer of frames from the memory based on information stored in the memory queues. For example, in one embodiment, the memory queues include the time stamp and/or priority associated with each pointer associated with a stored frame. The time stamp and priority information is used to determine the order of frames retrieved from the memory. The Dequeue processor may comprise any suitable hardware such as a CPU, gate array or other hardware logic, and may also include any suitable software to operate in conjunction with the hardware.

The Dequeue processor operates to process the time stamps associated with received data frames to determine the order that the received frames can be retrieved from the memory and transferred to the transmitter 308 for output to the next destination. For example, the Dequeue processor evaluates the time stamps available at the queue outputs to determine the memory pointer associated with the earliest time stamp. This memory pointer is used to retrieve the next frame from memory to be transferred to the transmitter 308 for output to the next destination.

In a configuration where multiple priority levels are used, a memory queue is used for each priority level associated with each communication fabric. The Dequeue processor operates to evaluate the time stamps and priority of all the queue outputs to determine the order of frames to transfer to the transmitter 308 for output to the next destination. However, in this configuration, the Dequeue processor operates to select frames having a higher priority before frames having a lower priority. Thus, in one embodiment, the Dequeue processor operates to evaluate time stamps associated with the highest priority frames to determine the frame having the earliest time stamp for output. This process occurs even though lower priority frames may have an earlier time stamp. Thus, the Dequeue processor operates to give preference to higher priority frames.

In one or more other embodiments included in the present invention, the Dequeue processor operates to implement a selection process for selecting a frame from both high and low priority frames. For example, if a low priority frame is time stamped earlier (by a selectable interval), than a higher priority frame, then the lower priority frame will be selected for output. Thus, the Dequeue processor may operate to implement any type of selection algorithm to select a frame for output from both low and high priority frames.

Another function performed by the Dequeue processor during the reordering process is to compensate for transmission latency through the fabrics. For example, as frames are transmitted from source to destination, they may be delayed as they flow through the communication fabrics. For example, in one situation, a later stamped frame may arrive at the destination before an earlier stamped frame.

To compensate for transmission latency, the Dequeue processor uses the time stamp information provided with received frames. For example, the source processors operate to time stamp the frames (when transmitted) with a value that accounts for the current time plus a transmission time latency parameter. As the frames are received at the destination, their time stamps and associated memory pointers are placed in selected memory queues. The Dequeue processor evaluates the time stamps at the queue outputs to determine which frame is to be retrieved from memory and output. However, if a later stamped frame flows through its transmission fabric quickly, it may be received at the destination before an earlier stamped frame that has been delayed in its transmission fabric. Without accounting for the transmission latency, the later stamped frame may be output before the earlier stamped frame, and so, the frames will not be reordered properly.

To avoid the possibility of a later stamped frame being output before an earlier stamped frame, the Dequeue processor operates to wait before outputting the selected frame until the current time (at the destination) reaches the time stamp value of the frame. This wait time operates to allow earlier stamped frames to flow through their respective communication fabric so that they can be received at the destination. When an earlier stamped frame is received at the destination within the wait time, the Dequeue processor operates to select this earlier stamped frame before the later stamped frame. Thus, the Dequeue processor compensates for transmission latencies to form the reordered output stream.

In the above-described embodiment, the source processors include a transmission latency parameter in the time stamp associated with each transmitted frame. Thus, the Dequeue processor needs only to wait until the current time at the destination reaches the time stamp value. In other embodiments, the source processors time stamp their transmitted frames with the current time at transmission. In this case, the Dequeue processor adds the transmission latency parameter to each time stamp to form a new time stamp, and waits until the current time reaches this new time stamp before outputting a selected frame. Thus, the latency time parameter allows data frames that might be delayed in transmission to be received at the destination for inclusion in the reordered output stream. Although two method of compensating for transmission latency have been described, any method to account for transmission latency may be included for use in the reordering system 206 in accordance with the present invention.

Figure 3:
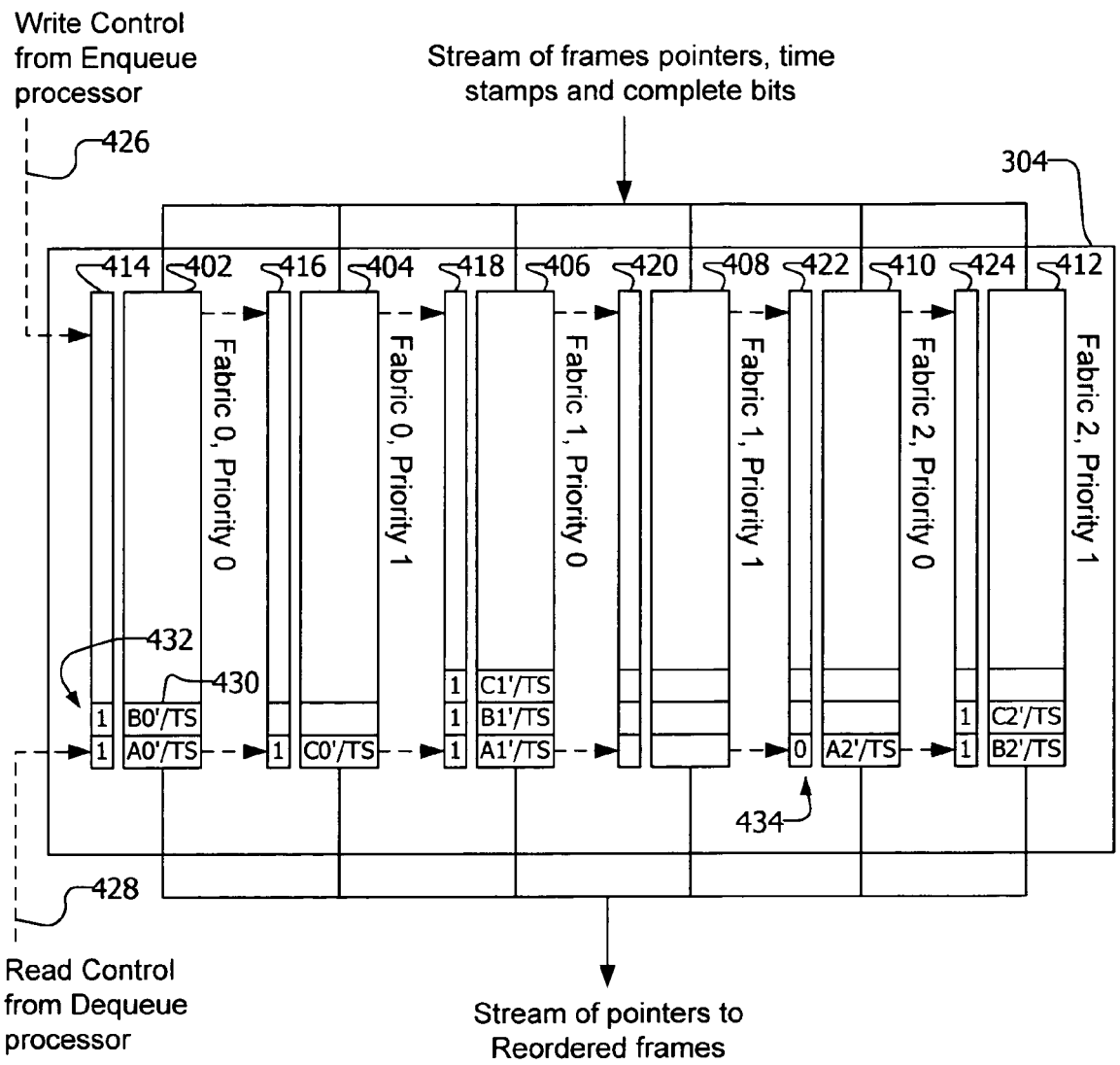
FIG. 3 shows a diagram of a memory for use in a reordering system.

FIG. 3 shows a portion of one embodiment of the memory 304 for use in the reordering system 206 in accordance with the present invention. The memory 304 includes a memory portion (not shown) and individual queues (402, 404, 406, 408, 410, 412) that are defined to store specific pointers to frames of received data that are stored in the memory portion. The memory portion may be any type of memory suitable for storing and retrieving frames of received data. The individual queues are allocated based on the number of communication fabrics and priority levels used. For example, queue 402 is used to store pointers to frames received from fabric 0 that have a priority of zero. Queue 404 is used to store pointers for frames received from fabric 0 that have a priority of one. Queues 406, 408, 410 and 412 are also defined to store pointers for frames received from selected fabrics and having selected priority levels, as shown. Also included in the memory 304 are complete bit queues 414-424 that are associated with the memory queues 402-412, respectively. The complete bit queues are used to store complete bits associated with the received data frames.

Both the memory queues and the complete bit queues are coupled to a write control line 426 that provides write control signals to allow information about the frames received at the receiver 302 to be written into the queues. The write control line 426 is coupled to the Enqueue processor 306, thereby allowing the Enqueue processor to control the write operations.

The memory queues and the complete bit queues are also coupled to a read control line 428 that provides read control signals to allow the information about the frames stored in the queues to be retrieved for processing. The read control line 428 is coupled to the Dequeue processor 312, thereby allowing the Dequeue processor to control the read operations.

As shown in FIG. 3, queue 402 has stored in it pointers (A0', B0') that point to locations in the memory where frames A0 and B0 are stored. For example, the pointer B0', shown at 430, points to where frame B0 is stored in the memory. Included with each frame pointer is a time stamp (TS) that was added to the frame by the source processor that transmitted the frame. Thus, each received frame at the destination processor is processed by the reordering system so that the frame data is stored in memory and a pointer to the frame data and the associated time stamp information is entered into a particular queue. The particular queue is the queue associated with the transmission fabric on which the frame was transmitted, and optionally, a priority indicator.

Referring again to FIG. 3, with regards to the queues for fabric 1, there are no priority 1 frames, so that that queue is empty as shown. With regards to the queues for fabric 2, there is one priority 0 frame and two priority 1 frames. Thus, during operation, the queues are filled with pointers to received frames of data as the frames are received at the destination processor. The complete bit queues indicate whether a complete frame has been received. For example, the frames A0 and B0 have been completely received at the destination as indicated by the corresponding "1's" entered in the complete bit queue 414, as shown at 432. However, the frame A2 has not been completely received as indicated by the "0" in the complete bit queue 422, as shown at 434.

Figure 4:
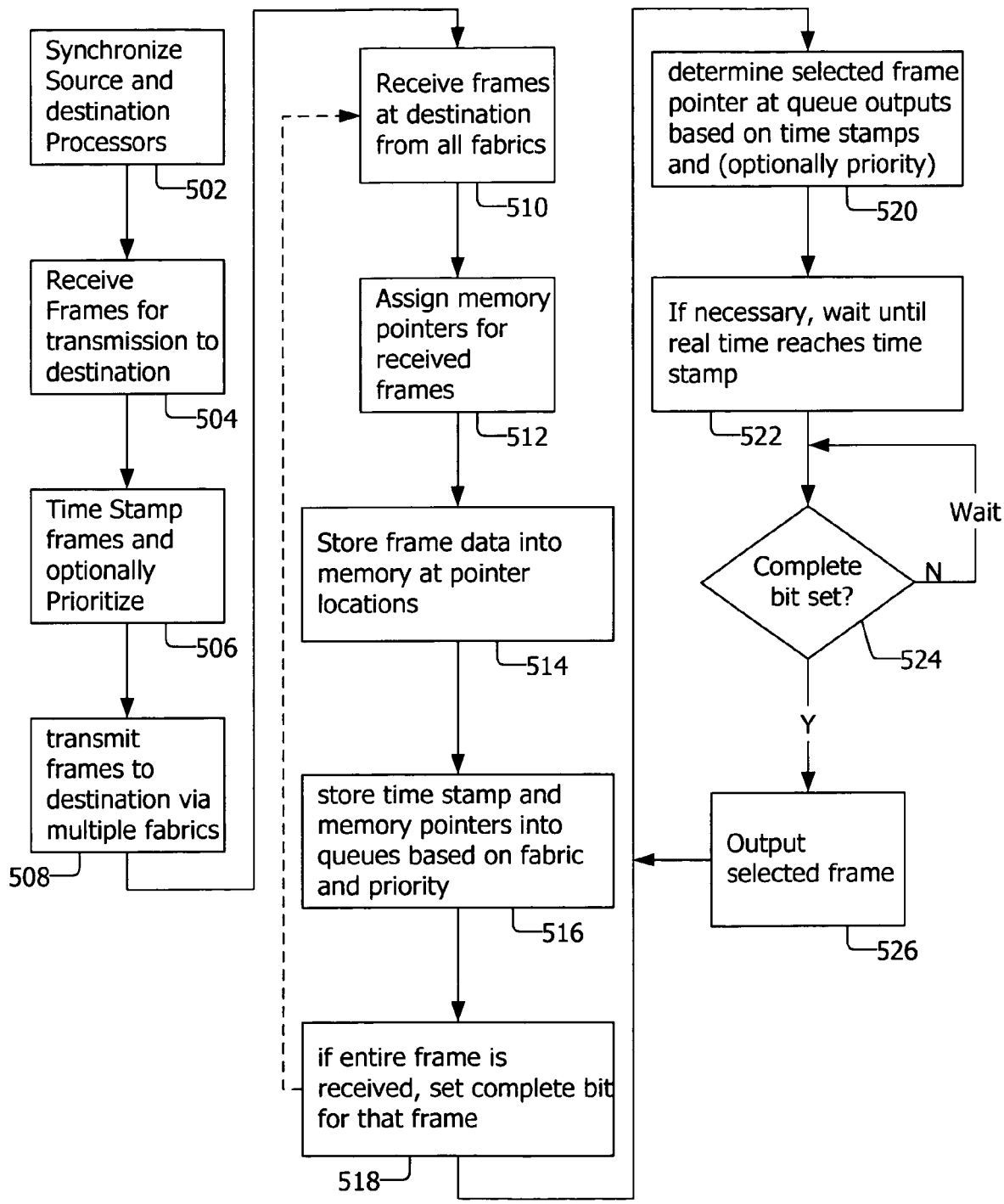
FIG. 4 shows a flow diagram for a method for reordering frames.

FIG. 4 shows a flow diagram 500 for one embodiment of a method for reordering frames in accordance with the present invention. At block 502, source and destination processors are synchronized so that they each have identical timing signals. For example, the source and destination processors may receive the same timing signals, or include independent timing apparatus that are synchronized to the same time source.

At block 504, streams of frames are received at the source processors for transmission over multiple fabrics to at least one destination processor. At block 506, the frames received at each source processor are time stamped and optionally encoded with a priority level. In one embodiment of the invention, the received frames are time stamped with a value that accounts for transmission latency time. For example, if a frame is transmitted from a source processor at time (5) and the expected transmission latency through the communication fabric to the destination is (10), then the frame is time stamped with a value of (15). In another embodiment included in the present invention, the frame is timed stamped with a value that reflects when it was transmitted from the source processor, and the destination processor operates to account for the transmission latency of the communication fabric.

At block 508, the sources transmit streams of time stamped frames, via multiple communication fabrics, to at least one destination processor. At block 510, the streams of time stamped frames are received at the destination processor.

At block 512, memory pointers are assigned to the streams of time stamped frames received at the destination processor. At block 514, the memory pointers are used to store the data associated with the received frames into memory. At block 516, the memory pointers and time stamps associated with the received frames are loaded into queues based on the transmission fabric, and optionally, the priority associated with each frame. For example, the number of queues used is determined by the number of transmitting fabrics and the frame prioritization. For example, if there are three transmitting fabrics and two levels of priority, then six memory queues are used.

At block 518, if an entire frame is received, an associated complete bit is set to indicate that the frame has been completely received at the destination. For example, if a frame is being received at the destination from a selected fabric, the assigned memory pointer and time stamp associated with the frame are entered into the correct queue. When the frame is completely received, a complete bit is entered into a complete bit queue that is also associated with the selected queue.

The above method steps are used in one embodiment of a reordering system constructed in accordance with the present invention to time stamp and transmit frames of data from source processors to a destination processor via multiple communication fabrics. The above method steps are used to receive and store time stamped frames of data at a destination processor. The following steps are used to perform reordering of those received frames in accordance with the present invention.

At block 520, a determination is made to determine a selected frame pointer at the queue outputs to be used to access a data frame for output from the destination. For example, the queue outputs show frame pointers and time stamps associated with data frames stored in a memory at the destination. The time stamps (and optional priority) are used to determine the pointer associated with the earliest stamped frame and having a selected priority level. Thus, it is possible for the Dequeue processor to determine which frame pointer to use to output the data having the earliest time stamp and selected priority level.

At block 522, once a frame has been selected for output, a wait period may be performed, if necessary, to give time for any missing frames having an earlier time stamp to be received at the destination. For example, due to the latency going through a fabric, one or more frames may be delayed for a certain time period from reaching the destination processor. In one embodiment of the invention, the frames are time stamped with a value that incorporates a transmission latency time. During reordering at the destination processor, the Dequeue processor selects the pointer from the memory queues having the earliest time stamp for output. The Dequeue processor then waits, if necessary, until the real time reaches the time stamp value associated with the selected frame. By waiting for the latency time to expire, the Dequeue processor assures that any frame delayed in transmission will arrive at the destination. Thus, earlier time stamped frames will not be bypassed in the reordered output.

In another embodiment included in the present invention, the frames are stamped with a transmission time at the source processor and the Dequeue processor adds a selected transmission latency time to the transmission time to determine how long to wait for potentially delayed frames. Thus, waiting until the transmission latency is accounted for allows delayed frames with earlier time stamps to be received at the destination for inclusion in the reordered output.

At block 524, a determination is made to determine whether or not the selected frame has been completely received by checking its associated complete bit. For example, when the selected frame is completely received, its associated complete bit in the complete bit queue will be set to a "1." If the complete bit is not set to a "1" then the method proceeds back to block 524 waiting for the selected frame to be completely received. If the complete bit for the selected frame is set to a "1", then the selected frame has been completely received and the method proceeds to block 526.

At block 526, the selected frame is retrieved from the memory using the address pointer at the output of the memory queue. In one embodiment, a determination between two or more frames is based on the respective priority of the frames. For example, if two frames from different sources have identical or almost identical time stamps, then their respective priority value can be used to determine which one will be output first. The retrieved data frame is then transferred to the transceiver where it is output to its next destination.

After outputting a frame at block 526, the method proceeds to block 520 where a next frame for output is determined based on the time stamps at the memory queue outputs. The method continues to receive data and determine the frames to output by repeating the above processes.

In accordance with the present invention, frames transmitted from a particular source are reordered to have the same order as when initially transmitted. Therefore, one or more embodiments included in the present invention provide a system for reordering frames in a switching network.

The present invention includes a system for reordering sequenced based packets in a switching network. The embodiments described above are illustrative of the present invention and are not intended to limit the scope of the invention to the particular embodiments described. Accordingly, while several embodiments of the invention have been illustrated and described, it will be appreciated that various changes can be made therein without departing from the spirit or essential characteristics thereof. Accordingly, the disclosures and descriptions herein are intended to be illustrative, but not limiting, of the scope of the invention, which is set forth in the following claims.

It is claimed:

1. An apparatus, comprising:
   means for receiving data packets, wherein each received data packet includes a time stamp parameter indicating a time the received data packet was transmitted;
   means for storing a memory pointer and a time stamp parameter associated with each of the received data packets in a selected one of a plurality of memory queues;
   means for determining a selected memory pointer from the plurality of memory queues, the selected memory pointer associated with a selected time stamp parameter; and
   means for processing the selected memory pointer to access a selected data packet for output in a reordered packet stream.

2. The apparatus of claim 1 further comprising:
   means for waiting for a selected time period before processing the selected memory pointer, the selected time period determined by a difference between a current time and the selected time stamp parameter.

3. The apparatus of claim 1 further comprising:
   means for including a priority value with each of the data packets.

4. The apparatus of claim 1, wherein the means for determining the selected memory pointer comprise means for determining, from a portion of the plurality of memory queues, the selected memory pointer associated with the selected time stamp parameter based at least in part on a selected priority value.

5. The apparatus of claim 1, further comprising means for defining the plurality of memory queues with equal numbers of memory queues in the plurality of memory queues and in one or more communication fabrics.

6. The apparatus of claim 1, further comprising means for including a priority level indicator with each of the data packets, and wherein the priority level indicator is chosen from one or more selected priority levels.

7. The apparatus of claim 5, wherein the means for defining comprise means for defining a total number of the plurality of memory queues equal to a number of the one or more communication fabrics times a number of selected priority levels.

8. The apparatus of claim 1, wherein the means for determining the selected memory pointer comprise means for determining the selected memory pointer associated with an earliest time stamp parameter.

9. An apparatus, comprising:
   an enqueue processor configured for controlling storage of pointers to a plurality of packets in a plurality of queues and corresponding order information about the plurality of packets in the plurality of queues, wherein the corresponding order information for each packet in the plurality of packets comprises a time stamp indicating a time the packet was transmitted; and
   a dequeue processor configured for:
      receiving the pointers and the corresponding order information from the plurality of queues,
      determining an order for outputting the plurality of packets in accordance with the corresponding order information, and
      accessing the plurality of packets pointed to by the received pointers for output in the order as a reordered packet stream.

10. The apparatus of claim 9, wherein the corresponding order information further comprises priorities, and wherein the dequeue processor is further configured for determining the order for outputting the plurality of packets in accordance with the time stamps and the priorities.

11. The apparatus of claim 9, further comprising:
    a receiver, configured to receive the plurality of packets from a plurality of communication fabrics; and
    a transmitter, configured to transmit the plurality of packets as the reordered packet stream.

12. The apparatus of claim 11, wherein the apparatus is configured to be synchronized with an external synchronization signal.

13. The apparatus of claim 9, wherein the plurality of queues is associated with a plurality of communication fabrics on at least a one to one basis.

14. The apparatus of claim 13, wherein the corresponding order information comprises priorities selected from a predefined set of priority levels, and wherein the plurality of queues are each assigned to one communication fabric of the plurality of communication fabrics and one priority level.

15. The apparatus of claim 9, wherein the enqueue processor is further configured for storing the plurality of packets in locations defined by the pointers.

16. The apparatus of claim 9, wherein each of the plurality of queues comprises a first-in-first-out memory that includes queue outputs for providing a single unit of corresponding order information at a time.

17. The apparatus of claim 16, wherein the dequeue processor is configured for receiving the corresponding order information from the queue outputs having units of corresponding order information with the earliest time stamps.

18. The apparatus of claim 17, wherein the corresponding order information comprises priorities selected from a predefined set of priority levels, and wherein the dequeue processor is operable to determine at the queue outputs an earliest time stamp associated with the highest priority.

19. A method, comprising:
controlling storage of pointers to packets in a plurality of queues and corresponding order information about the packets in the plurality of queues, wherein the corresponding order information for a packet includes a time stamp indicating a time the packet was transmitted;
determining an order for outputting the packets in accordance with the corresponding order information; and
accessing packets pointed to by the pointers for output in the order as a reordered packet stream.

20. The method of claim 19, wherein the corresponding order information comprises priorities, and wherein determining the order for outputting the packets comprises determining the order for outputting the packets in accordance with the time stamps and the priorities.

21. The method of claim 19, further comprising:
transmitting the packets via a plurality of communications fabrics; and
receiving the packets from the plurality of communications fabrics, wherein transmission of the packets and reception of the packets are synchronized.

22. The method of claim 19, further comprising storing the packets in locations defined by the pointers.

23. The method of claim 19, wherein the plurality of queues are configured to provide a single unit of corresponding order information at a time.

24. The method of claim 23, further comprising receiving the corresponding order information from the plurality of queues having corresponding order information with earliest time stamps.

25. The method of claim 24, wherein the corresponding order information comprises priorities selected from a predefined set of priority levels, and wherein determining the order for outputting the packets comprises determining the earliest time stamp parameter of the plurality of queues associated with a highest priority.

26. The method of claim 19, further comprising:
waiting a time period before outputting the packets, the time period determined by a difference between a current time and the respective time stamp of the packets.

27. An apparatus, comprising:
means for controlling storage of a plurality of pointers to a plurality of packets in a plurality of queues and corresponding order information about the plurality of packets in the plurality of queues, wherein the corresponding order information for a packet in the plurality of packets comprises a time stamp indicating a time when the packet was transmitted;
means for receiving the plurality of pointers and the corresponding order information from the plurality of queues;
means for determining an order for outputting the plurality of packets in accordance with the corresponding order information; and
means for outputting the plurality of packets pointed to by the plurality of pointers for output in the order as a reordered packet stream.

28. The apparatus of claim 27, wherein the corresponding order information comprises priorities, and wherein the means for determining the order comprises means for determining the order in accordance with the time stamps and the priorities.

29. The apparatus of claim 27, further comprising:
means for transmitting the plurality of packets via a plurality of communications fabrics; and
means for receiving the plurality of packets from the plurality of communications fabrics, wherein the means for transmitting and the means for receiving are synchronized.

30. The apparatus of claim 27, further comprising means for storing the plurality of packets in locations defined by the plurality of pointers.

31. The apparatus of claim 27, wherein the plurality of queues are configured to provide a single unit of corresponding order information at a time.

32. The apparatus of claim 31, further comprising means for receiving the corresponding order information from the plurality of queues having corresponding order information with earliest time stamps.

33. The apparatus of claim 32, wherein the corresponding order information comprises priorities selected from a predefined set of priority levels, and wherein the means for determining the order for outputting the plurality of packets comprise means for determining the earliest time stamp parameter of the plurality of queues associated with a highest priority.

34. The apparatus of claim 27, further comprising means for waiting a time period before outputting the plurality of packets, the time period determined by a difference between a current time and a respective time stamp of the corresponding order information for each of the plurality of packets.

* * * * *